(12) United States Patent
Follestad et al.

(10) Patent No.: US 6,541,581 B1
(45) Date of Patent: Apr. 1, 2003

(54) POLYETHYLENES OBTAINED BY USE OF DUAL SITE CATALYST

(75) Inventors: Arild Follestad, Stathelle (NO); Vidar Almquist, Porsgrunn (NO); Espen Ommundsen, Langesund (NO); Tore Dreng, Larvik (NO)

(73) Assignee: Borealis Technology Oy (FI)

( * ) Notice: Subject to any disclaimer, the term of this patent is extended or adjusted under 35 U.S.C. 154(b) by 0 days.

(21) Appl. No.: 09/601,654

(22) PCT Filed: Feb. 9, 1999

(86) PCT No.: PCT/NO99/00044

§ 371 (c)(1),
(2), (4) Date: Nov. 29, 2000

(87) PCT Pub. No.: WO99/40131

PCT Pub. Date: Aug. 12, 1999

(30) Foreign Application Priority Data

Feb. 9, 1998  (NO) ............................................ 19980552

(51) Int. Cl.$^7$ ............................ C08F 4/24; C08F 4/642; C08F 110/02; C08F 210/16
(52) U.S. Cl. ................... 526/105; 526/106; 526/160; 526/114; 526/348; 526/352; 525/240
(58) Field of Search ................................ 526/348, 105, 526/106, 114, 352, 160

(56) References Cited

U.S. PATENT DOCUMENTS 5,470,811 A * 11/1995 Jejelowo et al. ............ 502/117
6,013,596 A *  1/2000 Lhost et al. ................. 502/113

FOREIGN PATENT DOCUMENTS

| EP | 151 343       | * | 8/1985  |
| EP | 0 151 343 A1  |   | 8/1985  |
| EP | 0 339 571 A1  |   | 11/1989 |
| EP | 339 571       | * | 11/1989 |
| WO | WO 95/04761 A1|   | 2/1995  |

* cited by examiner

Primary Examiner—David W. Wu
Assistant Examiner—R Rabago
(74) Attorney, Agent, or Firm—Karen Lee Orzechowski Liniak Berenato & White

(57) ABSTRACT

A polyethylene produced by the homopolymerisation of ethylene or copolymerisation of ethylene with α-olefins in the presence of a catalyst, characterized in that the fraction of low molecular weight polymers having MW<5000 g/mole is lower than 12% by weight of the produced polymer, and that the produced polyethylene has a measured melt strength expressed by a haul-off (HO) value satisfying the expression: $HO > K_1 \cdot \eta 0.05 + K_2$, wherein $K_1$ is $9 \cdot 10^{-5}$ and $K_2$ is 0.4.

21 Claims, 3 Drawing Sheets

POLYETHYLENES OBTAINED BY USE OF DUAL SITE CATALYST

FIELD OF INVENTION

The present invention relates to linear polyethylenes obtained by catalytic (co)polymerisation of ethylene, optionally with α-olefins.

PRIOR ART

Linear polyethylenes, such as high density polyethylene (HDPE) and linear low density polyethylene (LLDPE), can be endowed with specific properties through a suitable choice of polymerisation conditions and polymerisation catalysts, of which chromium oxide and metallocene catalysts are among the commercially most important. Chromium oxide catalysts are characterized in that their active sites have different ratios between propagation and chain transfer. Moreover, their active sites have different ratios between comonomer propagation and ethylene propagation ratios. As a result, the obtained polymer will have possible comonomers (side chains) unevenly distributed between the macromolecules. Consequently, the produced polymers will have a broad molecular weight distribution, and these polymers will have good processability properties. The metallocene catalysts, often called single site catalysts (SSC) because all their active sites are equal, produces polymers having a narrow molecular weight distribution and an even distribution of possible comonomers and side chains along the polymer backbone. These polymers have desired properties like high impact strength, good transparency, and high hot tack. The main disadvantage is their poor processability due to to the narrow molecular weight distribution. A combination of the properties of chromium oxide and metallocene polymers would be highly desireable for many end uses, in particular will polyethylenes having a controlled broad or bimodal molecular weight distribution be advantageous in polymer processing by extrusion. Such polyethylenes have traditionally been produced by consecutive polymerisations at different conditions in two reactors in a series. Another approach has been to perform the polymerisations in the presence of a modified catalyst, including the use of combinations of different catalysts. However, when combining different catalysts, they often have a tendency to inactivate each other.

U.S. Pat. No. 3,378,536 discloses a process for the polymerisation of ethylene by the use of a two-component catalyst system consisting of (a) chromium deposited on e.g. silica; and (b) chromium or vanadium arene where the arene is an aromatic, optionally substituted, $C_6$ ring. The two catalyst components are preferably fed separately to the polymerisation reactor.

EP 088 562 discloses a modified polymerisation catalyst comprising a silica support with deposited chromium. Following oxidation in dry air, the chromium is modified by being contacted with a transition metal compound. The obtained polyethylenes have a substantial degree of branching and a medium to broad molecular weight distribution.

U.S. Pat. No. 5,330,950 and 5,408,015 relate to ethylene polymers having broad molecular weight distributions, obtained by the use of a catalytic mixture including a MgO-supported Ziegler catalyst and a chromium oxide catalyst.

EP 339571 discloses a process for producing polyethylenes having a broad molecular weight distribution by the use of a catalyst system consisting of: a catalyst component (A) comprising a silica support onto which there is deposited a titanium or chromium compound; a catalyst component (B) comprising a transition metal compound; and a catalyst component (C) which is an aluminoxane, e.g. MAO. The MAO and the metallocene are not impregnated into the catalyst support and therefore the catalyst will not be a true dual site catalyst. The two types of catalyst sites or precursor sites are not directly exposed to each other. There is no mention of any prereduction of $Cr^{6+}$ to $Cr^{2+}$. The polymerisations will result in polymers having an undesireable amount of low molecular weight polymers.

WO 96/14154 discloses a dual site catalyst comprising a calcined silica support impregnated with dibutylmagnesium, 1-butanol and $TiCl_4$, and also impregnated with MAO and $(BuCp)_2ZrCl_2$. This catalyst, which contains both a non-metallocene and a metallocene transition metal component, is used in the polymerisation of ethylene in one single reactor to obtain polyethylenes having a bimodal molecular weight distribution.

The object of the present invention is to provide ethylene polymers having a controlled bimodal or broad molecular weight distribution. The polyethylenes are obtained by the use of a novel dual site catalyst that combines the features of both chromium oxide and metallocene catalysts. A remarkable advantage is that this catalyst produces chromium and metallocene polyethylenes simultaneously and mixed in one and the same polymer particle. The polymer particles as polymerised will when processed give a homogeneous polymer melt. With this novel dual site catalyst polyethylene resins for a broad application area can be produced. The resins have particularly good extrusion properties and are especially well suited for processing by film blowing and foaming, optionally for blow moulding and pipe extrusion.

SUMMARY OF THE INVENTION

The present invention thus provides a polyethylene produced by the homopolymerisation of ethylene or copolymerisation of ethylene with α-olefins in the presence of a catalyst, characterized in that the fraction of low molecular weight polymers having MW<5000 g/mole is lower than 12% by weight of the produced polymer, and that the produced polyethylene has a measured melt strength expressed by a haul-off (HO) value satisfying the expression:

$$HO > K_1 \cdot \eta_{0.05} + K_2,$$

wherein $K_1$ is $9 \cdot 10^{-5}$ and $K_2$ is 0.4.

The polyethylenes are preferably obtained by polymerisation in a single polymerisation process in the presence of a particulate modified catalyst comprising:

a) a chromium-oxide catalyst comprising a chromium oxide mainly in a bivalent oxidation state combined with an inorganic support containing above 85% by weight of silica, b) a transition metal compound comprising at least one cyclopentadienylic ring bonded to said transition metal, which cyclopentadienylic ring may contain hetero atoms, be unsubstituted or substituted, bonded to the transition metal through a bridge, optionally annealed to other substituted or unsubstituted ring structures, and if two cyclopentadienyl rings are present they may be bonded to each other through a bridge, and c) a catalyst activator being an aluminoxane.

DETAILED DESCRIPTION OF THE INVENTION

Figure 1:
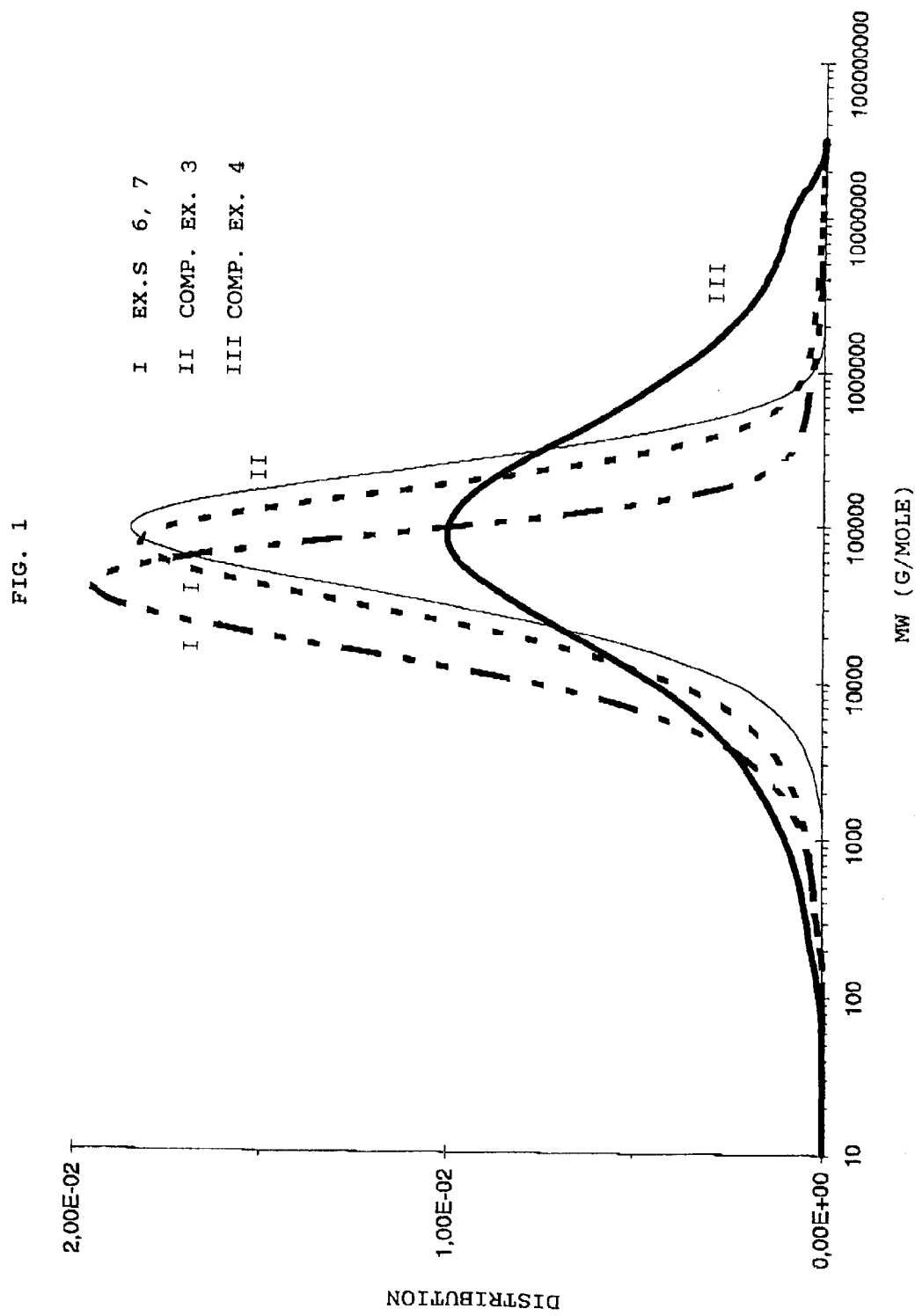
FIG. 1 is a collection of graphs showing the typical molecular weight distributions for polyethylenes made from a catalyst according to the invention (graphs I), a single site catalyst (graph II) and a modified chromium catalyst (graph III).

In this specification, the term "polyethylene" refers to both ethylene homopolymers and copolymers. Thus, ethylene may be polymerised alone or with up to 20% by weight of a comonomer or a mixture of different comonomers. As comonomers may be used all polymerizable α-olefins of the general formula $CH_2=CHR$, wherein R is a hydrocarbon radical containing 1–18 carbon atoms, preferably 1–10 carbon atoms. Examples of particularly preferred α-olefins are propylene, 1-butene, 1-hexene, 4-methyl-1-pentene and 1-octene. Also styrene and norbornene may be used as comonomers.

Polymerisations can be performed in any conventional type of reactor, such as in a batch reactor or most preferably in a continuous reactor. The present catalysts are suited for use in all types of olefin polymerisations, in particular gas phase and suspension polymerisations.

The catalyst used in the polymerisations contains both a chromium and a single site catalyst, as well as an activator, joined to a support. Suitable catalyst supports are particulate inorganic, oxygen-containing compounds, preferably selected from the group comprising silica, alumina and silica/alumina, more preferably silica-based supports containing more than 85% by weight of silica.

A catalyst precursor is prepared by joining an appropriate amount of a chromium compound to the surface of the support. Minor amounts of titanium and/or aluminium compounds may also be incorporated, either together with the chromium compound, or separately. The chromium compound used may be any appropriate chromium salt, or an inorganic or organic chromium compound that can be oxidised to a chromium oxide. The amount of chromium compound mixed with the inorganic support must be sufficient to finally obtain between 0.001% and 10%, preferably from 0.1% to 2.0%, by weight of chromium, calculated as metallic chromium, based on the weight of the inorganic support. The chromium compound may be joined to the surface of the support preferably by coprecipitation of the chromium compound with the inorganic oxygen-containing compound and then forming the precipitate into catalyst particles. When the impregnation is finished any possible remaining solvent is removed to obtain a dry solid.

Such solid chromium oxide/support catalyst precursors are commercially available from a number of producers. A closer description of their preparation is therefore regarded as being superfluous. Useful catalyst precursors have average particle sizes preferably in the range from about 10 μm to greater than 150 μm, more preferred from 20 μm to 120 μm, and a particle size distribution from narrow to broad. The particles may be of a spherical shape obtained by the spray drying of a suspension, or having an irregular geometry obtained by comminuting a solid substance. The final catalyst component particles should have a surface area from 150 to 600 $m^2/g$, more preferred from 400 to 550 $m^2/g$, and a pore volume from 1 to 3 $cm^3/g$.

The obtained catalyst precursor has to be activated before use. This is done by calcination in dry air or another oxygen-containing gas at temperatures in the range from 400 to 950° C., preferably from 550 to 900° C., during a period from 10 minutes to 72 hours, preferably from 2 to 20 hours.

The oxidised catalyst precursor may be subjected to reduction, preferably with carbon monoxide or a mixture of carbon monoxide and an inert component, such as nitrogen or argon. The reduction is normally performed at a temperature within the range from 300 to 500° C. during a period from 5 minutes to 48 hours, preferably from 1 to 10 hours. When the reduction treatment is finished, the major part of the contained chromium should preferably be in a divalent oxidation state. Such a reduction step is not obligatory. Unreduced chromium oxide will eventually be reduced by the olefin monomers during polymerisation. The only drawback is that there will be observed an induction period before the chromium oxide catalyst sites start to produce polyethylenes. When the chromium oxide/support catalyst component is in a reduced state, either as a dry powder or as a suspension in a dry oxygen-free hydrocarbon solvent, e.g. an alkane, it must be stored under inert conditions.

The present invention is not restricted to any particular procedure for the preparation of the chromium oxide/support catalyst. However, certain polymer properties may vary depending on the particular conditions applied during the preparation of the chromium catalyst.

The obtained chromium oxide/support catalyst is then impregnated with a transition metal compound comprising at least one cyclopentadienylic ring bonded to the transition metal. This cyclopentadienylic ring may contain hetero atoms, be unsubstituted or substituted. The cyclopentadienylic ring may be bonded directly to the transition metal or through a bridge. Also, it may optionally be annealed to other ring structures which themselves may be substituted. If two cyclopentadienyl rings are present they may be bonded to each other through a bridge. Such a transition metal compound is often generally termed "metallocene". Among the many different metallocenes that may be useful in the present invention, particularly preferred compounds are such in which the transition metal is selected from titanium, zirconium and hafnium. Also bonded to the transition metal will be at least one ligand, preferably selected from the group comprising alkoxy, amido and hydrocarbyl radicals, halogen and hydride. During the preparation of the final catalyst it is believed that this ligand, partly or completely, will leave the transition metal compound upon the action of the catalyst activator and/or monomers.

Suitable metallocene compounds of the composition above are known in the art and have been recited in earlier patent publications (see for example WO 96/14154 mentioned above). Preferred metallocene compounds are bis-(alkylcyclopentadienyl)-transition metal halides, preferably bis-(n-butylcyclopentadienyl)-zirconium dichloride or bis-(n-butylcyclopentadienyl)-hafnium dichloride. Metallocene catalysts are often designated "single site catalyst", abbreviated SSC. Polymers produced by a single site is catalyst may be defined as a polymer that will have a ratio between its weight average molecular weight (Mw) and its number average molecular weight (Mn) of Mw/Mn<4. A procedure for the preparation of supported metallocene catalysts is disclosed in Applicant's earlier Norwegian patent application no. NO 960898, the description of which is included herein by reference. The obtained catalyst particles of the present invention will produce polymer particles having a good morphology.

The catalyst must also comprise an activator component, such as an aluminoxan or an ionic activator, preferably an aluminoxan, and most preferably methylaluminoxane (MAO). The aluminoxan may be deposited onto the activated chromium oxide/support catalyst before, simultaneously with or after the deposition of the metallocene compound. Most conveniently both aluminoxan and metallocene are dissolved in a solvent, e.g. toluene, and the combined toluene solution is used to impregnate the chromium oxide/support catalyst. Eventually the solvent is removed by evaporation, preferably in an inert atmosphere, whereupon the catalyst is ready for use. The final catalyst will contain both chromium, zirconium or hafnium, and aluminium. In an embodiment of the present catalyst, it contains from 0.2% to 5%, preferably from 0.4% to 1%, by weight of chromium; from 0.05% to 0.6%, preferably about 0.2%, by weight of zirconium; and from 5% to 20%, preferably about 5%, by weight of aluminium; calculated as metal based on the total weight of the catalyst.

The catalyst of the present invention shows a high activity in polymerisations. This is surprising because the different catalytic sites are in intimate contact with each other and this is often seen to result in a mutual inactivation. Moreover, at least the chromium oxide sites would be expected to be physically inaccessible by a covering layer of MAO. However, experiments reveal that this catalyst will produce, simultanously, both chromium oxide and metallocene polyethylenes, and this represents a unique feature of the present catalyst. The chromium sites on the catalyst will behave like a $Cr/SiO_2$ catalyst and produce polyethylenes having a high average molecular weight and a broad MWD, while the metallocene sites on the catalyst will act independently of the chromium sites and produce polyethylenes having a lower average molecular weight and a narrow MWD. Thus, each polymer particle will contain both chromium and metallocene based polymers, preferably not less than 40%, more preferred not less than 60% of single site polymer by weight of the total polymer. The final polymer resin will have a superior morphology compared with polymer resins produced from catalytic systems where one site is in solution. The final polymer will therefore produce a homogeneous melt when processed.

Prior to polymerisation, the catalyst may optionally be prepolymerized with a minor amount of ethylene in accordance with methods well known in the art, before being fed continuously to the polymerisation reactor. In general, polymerisations are performed at temperatures below about 110° C., and at a total pressure in the range of up to 70 bar. Hydrogen is used to control the molecular weight and melt index of the polymer, while comonomers are used to control the branching on the polyethylene backbone and hence the density of the polyethylene. The polymerisation parameters mentioned above are well known in the art and further details concerning polymerisations should be superfluous. Typical polymerisation conditions are presented in the examples below.

The polyethylenes produced with the present catalysts may have a number average molecular weight (Mn) of the same magnitude as the metallocene-based polyethylenes, and a MWD of the same magnitude as the chromium-based polyethylenes. Thus, the polyethylenes will have a broad molecular weight distribution (MWD) with a more or less distinct tail at the low and/or high molecular weight parts of a MWD graph.

In FIG. 1, the two graphs I (curves with broken lines) represents typical molecular weight distributions for polyethylenes of the invention. Graph II (thin, solid line) illustrates the molecular weight distribution of a typical polyethylene produced from a single site catalyst (comparative example 3), and graph III (thick, solid line) illustrates the molecular weight distribution of a polyethylene produced from a chromium catalyst (comparative example 4).

Figure 2:
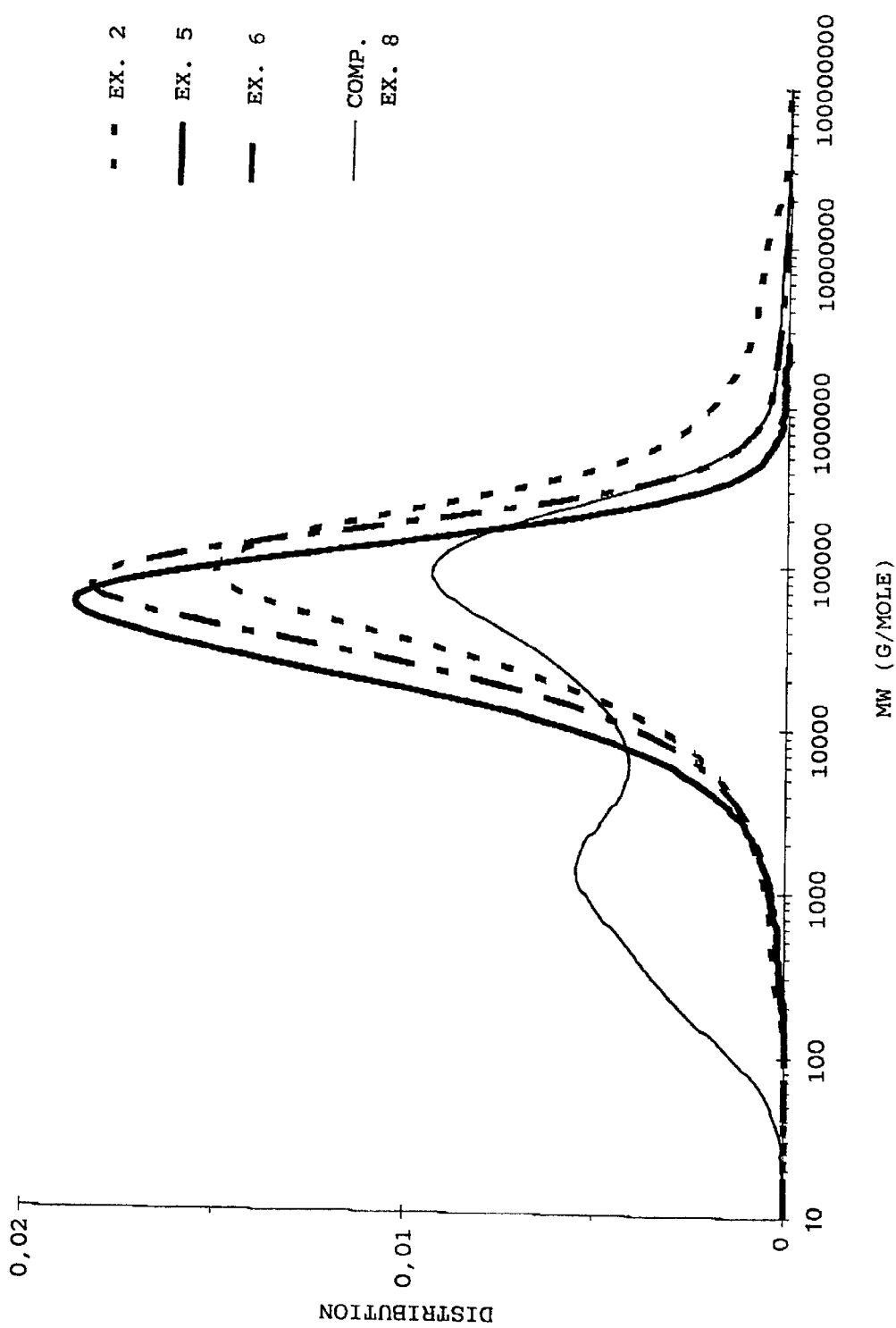
FIG. 2 presents molecular weight distribution curves recorded for three polyethylenes of the invention (thick lines) and for a prior art polyethylene (thin, solid line).

FIG. 2 shows the molecular weight distributions of the polyethylenes obtained in examples 2, 5 and 6 of the invention. The variation in molecular weights reflects variations in the polymerisation conditions and pretreatments of the catalyst. The obtained polyethylenes distinguish themselves from metallocene-based polyethylenes in that they contain a certain fraction of high molecular weight polymers (for example above Mw of $10^6$). Metallocene-based polyethylenes lack such a high molecular weight fraction, as evidenced from graph II in FIG. 1. Further, the polyethylenes of the invention contain a relatively small fraction of low molecular weight polymers compared with chromium-based polyethylenes. A prolongation of the left straight part of the MWD curve for the polyethylenes of the present invention will intercept the abscissa at a MW value of about 5000. In this invention the weight fraction of polymers having a molecular weight lower than about 5000 g/mole is defined as the very low molecular weight fraction (VLMWF) of the polymer. This amount is determined by the use of gel permeation chromatography (GPC). The polyethylenes of the present invention will contain a fraction of polymers of very low molecular weights amounting to less than 12%, preferably less than 7%, more preferred less than 5% by weight of the polymer. A small VLMWF is important, because low molecular weight polymers may create problems in processing, e.g. emitting smoke and odour, and causing die plate-out during extrusion. FIG. 2 also shows the MWD graph of a polyethylene produced from a prior art catalyst (comparative example 8) resembling the one used in the present invention. This known catalyst contains similar catalytic components as the present catalyst, but the components are not combined in one catalyst particle as in the present invention. The MWD graph of the polyethylene of comparative example 8 shows a high fraction of low molecular weight polymers.

The present polyethylenes will have a density from 910 to >960 $kg/m^3$, and a melt index (MFR 2) from 0.01 to above 100 g/10 min, preferably from 0.1 to 60 g/10 min (determined according to the method of ASTM 1238), depending on the polymerisation conditions, as explained above. The present polyethylenes may also have an $MFR_{21}$ in the range of the range of 1 to 100 g/10 min. Both the chromium and the metallocene catalysts used in the examples will produce polyethylenes mainly free of long chain branching. Preferably the whole polymer is essentially free of such long chain branching.

Figure 3:
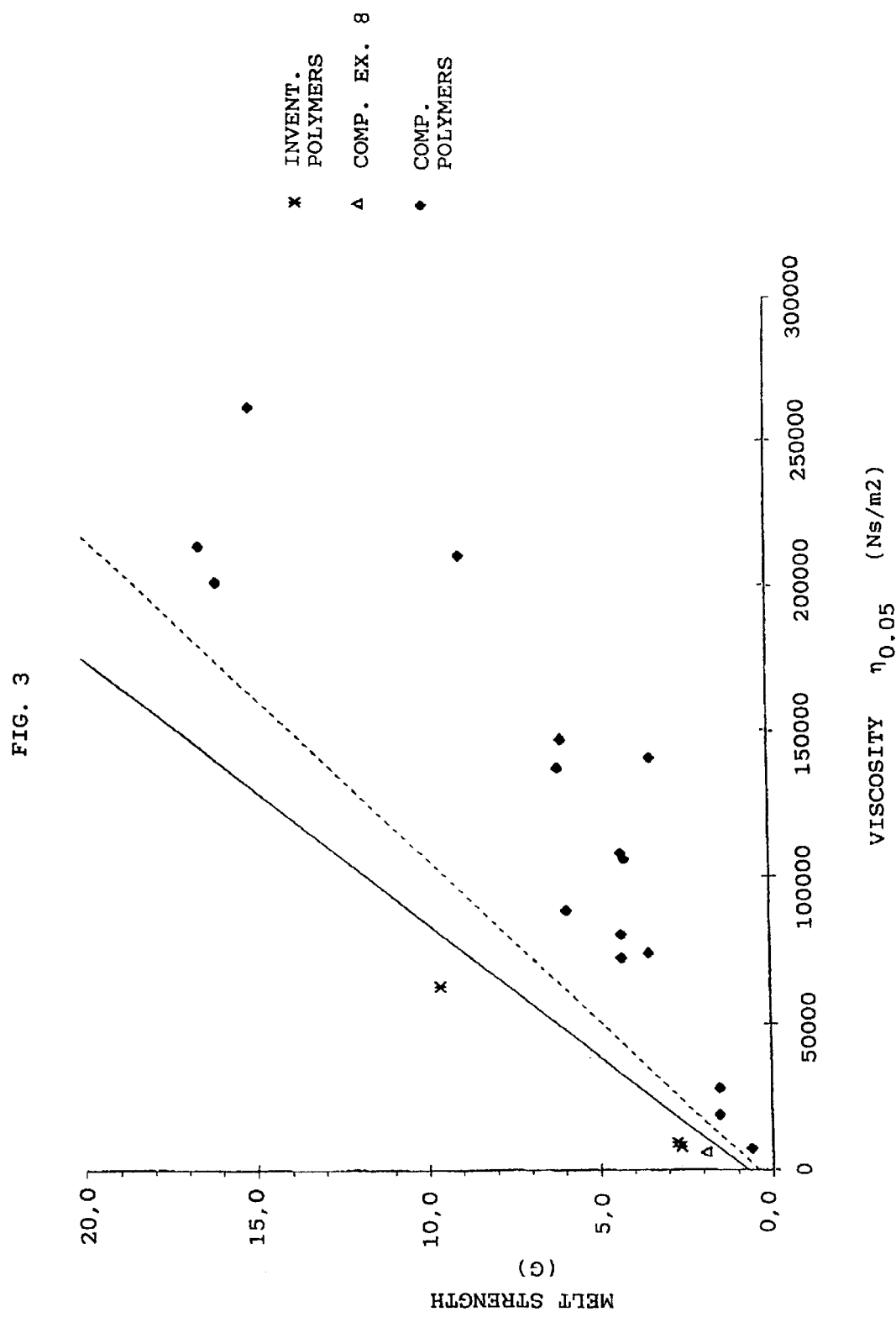
FIG. 3 is a graph showing melt strength versus melt viscosity for polyethylenes of the invention and various commercially available catalytically polymerised polyethylenes.

A novel feature of the polyethylenes of the present invention is their favourable combination of high melt strength and low melt viscosity. Melt strength is the ability of the polymer melt to resist elongation when an elongational stress is applied. A high melt strength is usually associated with the property of strain hardening, i.e. the phenimena that the stress needed for further elongation will increase with the degree of already obtained elongation. In the area of blow-moulding it is especially important to have a high melt strength. If the melt strength is poor, the melted parison might sag or even drop to the floor before the mould closes. Also in blown film and vacuum forming processes and for some fibre applications melt strength and shear hardening are important factors. By extruding the polyethylene through a capillary die in a rheometer the melt viscosity will be determined. Simultaneously the extruded monofilament may be subjected to an elongational force to determine its melt strength. This test, often termed "haul-off" method, is detailed below. FIG. 3 shows test results obtained by this method. The melt strength is plotted against the viscosity of the polymer melt.

The polyethylenes of the present invention may be characterized by a haul-off strength (HO) that satisfies the equation $$HO > K_1 \cdot \eta_{0.05} + K_2 \quad (1)$$

wherein HO is the actually measured melt strength in grams, $\eta_{0.05}$ is the melt viscosity in $Ns/m^2$ at a shear rate of $0.05\ s^{-1}$ and $K_1$ is a constant within the range of from $9.10^{-5}$ to $11.10^{-5}$, and $K_2$ is a constant within the range from 0.4 to 0.7. Preferably $K_1=9 \cdot 10^{-5}$ and $K_2=0.4$, i.e. the measured haul-off strength of the polyethylenes of the present invention will have values above the straight dotted line in FIG. 3 represented by the expression $$HO = 9 \cdot 10^{-5} \cdot \eta_{0.05} + 0.4 \quad (2)$$

More preferably, $K_1=11 \cdot 10^{-5}$ and $K_2=0.7$, i.e. the measured haul-off strength of the polyethylenes of the present invention will have values above the straight solid line in FIG. 3 represented by the expression $$HO = 11 \cdot 10^{-5} \cdot \eta_{0.05} + 0.7 \quad (3)$$

Obtained results with polyethylenes of the invention are indicated by *, the polyethylene of comparative example 8 is indicated by Δ, and various commercially available polyethylenes intended for various fields of use are indicated by ■. While the polyethylene of comparative example 8 is in the same region as the present polyethylenes, it contains an unacceptable high fraction of low molecular polymers.

It is known in the art to produce polyethylenes having both high melt strength and a low content of VLMWF. Such polyethylenes will have a high molecular weight, and consequently this will result in poor processability of the polymer, which means that during extrusion high extrusion pressures, high torque and motor loading are required, and the result is low outputs. This problem is solved with the present polyethylenes.

As discussed above, the present polyethylenes are assumed to consist of a blend of chromium and single site polyethylenes, and consequently it would be reasonable to assume that their melt strengths would show intermediate values between chromium and single site polyethylenes. This is not so. On the contrary, the present polyethylenes show higher haul-off values than those on a line connecting a single site polymer with a chromium oxide polymer. It is observed a favourable combination of high melt strengths and low melt viscosity is surprising. The results indicate that a synergistic effect has been obtained. Further, it is surprising that these polymers are unique in having such a favourable combination of properties.

The present invention shall now be explained in more details by the following examples.

EXAMPLES

Preparation of Polymerisation Catalysts

Cr/SiO$_2$ Catalyst Precursor

In the following examples two different commercially available Cr/SiO$_2$ catalyst precursors were used, denominated A and B, obtainable from various companies, for instance from companies Grace, Crosfield or PQ. The compositions of the catalyst precursors are indicated in table 1.

TABLE 1

Cr/SiO$_2$ catalyst precursors

| | A | B |
|---|---|---|
| Chromium (wt %) | 0.5 | 1.0 |
| Aluminium (wt %) | 0.8 | <0.3 |
| Titanium (wt %) | 0 | 2.5 |
| Pore volume (ml/g) | 2.5 | 2.5 |
| Surface area (m$^2$/g) | 400 | 450 |

The calcination/activation of the catalyst precursors were carried out under fluidized bed conditions at the temperatures indicated in table 3. Each catalyst precursor was activated/calcined in dry air for 5 hours to oxidise Cr to hexavalent Cr (CrO$_3$) and reduce the concentration of surface hydroxyl. Optionally, this oxidation step was followed by reduction for 3 hours with carbon monoxide (CO) in nitrogen (N$_2$) to reduce the oxidation state of the chromium.

Impregnation with a Metallocene Compound and MAO

All calcined components listed in Table 1 were transferred to a glove box and in a dry, oxygen-free nitrogen atmosphere impregnated with bis(n-butylcyclopentadienyl)zirconium dichloride and with methyl aluminoxane, according to the following procedure:

1) bis(n-butylcyclopentadienyl)zirconium dichloride is weighed into a Thomas flask equipped with a magnet bar stirrer;
2) 30% by weight of methyl aluminoxane (MAO) in toluene is added to the transition metal salt;
3) an additional amount of toluene is added and the content of the flask stirred for 30 minutes;
4) each catalyst component indicated in Table 1 is weighed into another Thomas flask equipped with a lid and a magnet stirrer; and
5) the catalyst component is stirred while the solution from step (3) is added dropwise by means of a syringe during a period from 5 to 10 minutes, thus obtaining a free flowing, not saturated powder, free from any lumps,
6) the stirring of the impregnated powder is continued for another 30 minutes, and subsequently
7) the lid on the flask is punctured with two cannula and a nitrogen purge established through the space inside the flask for about 30 minutes, and
8) the dried catalyst is stored under nitrogen until use.

Experimental parameters are given in Table 2.

TABLE 2

| | Catalysts | | | |
|---|---|---|---|---|
| Catalyst | Chromium catalyst (g) | Zr compound (g) | MAO (ml) | Toluene (ml) |
| A | 3.00 | 0.033 | 3.57 | 3.63 |
| B | 3.00 | 0.033 | 3.57 | 3.93 |

General Polymerisation Procedures

A laboratory stainless steel batch reactor equipped with a paddle stirrer was heated at 80° C. to 100° C. and purged with nitrogen, then a specific amount of catalyst was introduced, and isobutan was added under stirring. The temperature was adjusted to the desired level and monomers, optionally also hydrogen, fed to the reactor. The overall internal reactor pressure was kept constant during the entire polymerisation run by feeding ethylene. The ethylene consumption was monitored during the polymerisation. When hexene-1 was used as a comonomer, this was fed to the reactor together with the isobutane. Hydrogen, when used, was added continuously to the reactor blended into the ethylene feed. All reagents used was of "polymerisation grade".

The comonomer was fed to the reactor by the use of a pump working in cascade with the ethylene feeding system. The reactor temperature was kept constant at a fixed temperature to an accuracy of +/−0,2° C. by automatically adjusting heating and/or cooling of the reactor. The polymerisation run was stopped when a desired polymer yield had been reached, or after a preset polymerisation time. The obtained polymer was weighed and samples collected for further treatment and measurements. A major sample was blended with an additive-containing masterbatch to stabilise the polymer prior to further treatments. Reactor conditions for the polymerisations are presented in the tables.

Polymer Characterisation Methods

The properties of the obtained polymers were determined by the use of the following characterisation methods:

Melt index, MFR, was determined by the method of ASTM D 1238 (190° C., loads of 2.16 and 21.6 kg). The ratio between the melt indices obtained with 21.6 and 2.16 kg loads is reported as FRR.

Molecular weight distribution (MWD) was determined by gel permeation chromatography (GPC) with a refractive index detector. The area under the MWD curve up to a value of 5000 g/mole was integrated in order to find the weight fraction of very low molecular weight polymers (VLMWF).

Rheology The relation between the molecular weight (Mw) determined by gel permeation chromatograpy (GPC) and zero viscosity ($\eta_0$) determined by dynamic measurements is expressed by the well known equation:

$$\eta_0 = K \cdot (Mw)^\alpha$$

where K is a proportional constant and $\alpha > 1$. Because zero viscosity often is difficult to calculate $\eta(0.05)$ is used instead. Thus, a high $\eta(0.05)$ value means high molecular weight. Polymers with a broad molecular weight distribution (MWD) have a more pronounced shear thinning compared to polymers with a narrow MWD. Thus, a polymer with broad MWD will have a low $\eta(300)$ value even if it has a high $\eta(0.05)$ value. The viscosity was measured with a Rheometrics RDA II rheology dynamic analyzer or dynamic spectrometer. The measurements were performed according to ISO 6721-10. The temperature was 190° C. Parallel plate geometry was used, and the frequency speed was in the range 0.1–300 rad/s.

Polydispersity Index, PI, given by the expression: $PI=10^5/x$, wherein x is the value on the abscissa at the point of intersection between G' and G". A modulus of rigidity, G*, is defined by the expression: $G^*=G'+iG"$, where the real part, the storage modulus G', expresses the elasticity of the polymer while the imaginary part, the loss modulus G", expresses the viscous part of the polymer. A more elastic polymer then gives higher G values than a less elastic polymer. A plot of G'/freq versus G"/freq gives information about the elasticity of polymers. When the G' curve has a steeper slope, the point of intersection will take place at a smaller x value and PI will increase, i.e. more elastic polymers (i.e. polymers having a broader MWD) will give higher PI values.

Gel Permeation Chromatography, GPC, was used to separate molecules according to their sizes and to calculate Mw, Mn and MWD. It was also used to estimate the fraction of polymer made from the two different types of catalytic sites.

Infrared Analysis, IR, in the range 1250 to 890 cm$^{-1}$ was used to detect end groups and the comonomer contents in the polymers. Polyethylenes produced with chromium catalysts will have unsaturation mainly as vinyl end groups, while metallocene catalysts produces mainly trans-vinylene end groups, and thus the fraction of polyethylenes produced from each catalyst can be quantified.

Melt strength was determined by a "haul-off" method by using an apparatus consisting of a capillary rheometer, which is available under the trademark "Rhosand RH-7", a haul-off device and a force transducer to measure the strength of the polymer melt. A polymer sample was conditioned in the rheometer for 10 minutes at 190° C. before extrusion through a cylindrical die having an opening of 1 mm in diameter and a length of 16 mm. The die inlet angle was 180 degrees. The rheometer piston had a diameter of 15 mm and the speed was 1 mm/min. The haul-off speed of the solidified extruded monofilament was 1 m/min. The polymer was extruded through the die as a monofilament downward. At distance from the die the force measuring device was attached to the monofilament and the melt strength at constant extrusion speed was recorded. The force measuring device consisted of a weight, and the force was recorded as the mass of the weighting. A higher measured force indicates a higher melt strength. A haul off value of 10 g thus corresponds to a longitudinal force on the monofilament of 0.098 N. The melt strengths will usually increase with the viscosity, expressed by $\eta_{0.05}$, of the polymer melt.

In the following examples 1 to 7 all experimental parameters and polymerisation results are presented in Table 3.

Example 1

In an 8 l stainless steel reactor ethylene with 0.2% by weight of hexene was polymerised at 80° C. in the presence of catalyst A specified in Table 2 above, according to the general polymerisation procedure described above.

Example 2

The polymerisation procedure of Example 1 was repeated, except that the chromium of the catalyst was in a not reduced state. The polymerisation activity was low.

Example 3 (Comparative)

The polymerisation procedure of Example 1 was repeated, except that the catalyst used was a conventional metallocene catalyst (SSC). The activity of the catalyst was low.

Example 4 (Comparative)

The polymerisation procedure of Example 1 was repeated with a catalyst having the same specifications as the catalyst of example 1, except that the chromium oxide/silica catalyst had not been impregnated with metallocene, only with MAO. The activity of the catalyst was very low.

Example 5

Polymerisation of ethylene in the presence of catalyst A was performed in a 2 l stainless steel reactor with a reaction medium of 1 l isobutane containing 0.16% by weight of hexene as comonomer. The polymerisations were allowed to proceed for 60 min and were then terminated.

Example 6

The catalyst B specified in Tables 1 and 2 calcined at 815° C. and then reduced at 380° C. before being impregnated with the single site metallocene catalyst and aluminoxan, as explained in detail above, was used in the polymerisation of ethylene.

Example 7

The procedure of Example 6 was repeated, except that the catalyst was activated at a lower temperature of 620° C.

The results from the characterisations of the obtained polyethylenes presented in Table 3 show that the polymers obtained with the present catalyst will have an increased Mw and MWD compared with the metallocene based catalysts (comparative example 3) and reduced Mw and MWD compared with the chromium based catalyst (comparative example 4).

IR analyses of films made from the obtained polymers will detect the fraction of polymers polymerised from the metallocene sites on the catalysts. The results presented in Table 3 supports that both the metallocene and chromium sites are active during polymerisations. It is obvious that the dual site catalysts of the to present invention produces two different polyethylenes simultaneously.

TABLE 3

| | Examples | | | | | | |
|---|---|---|---|---|---|---|---|
| | 1 | 2 | Comp. 3 | Comp. 4 | 5 | 6 | 7 |
| Catalyst | A | A[1)] | SSC | Cr/MAO[2)] | A | B | B |
| | | | Polymerisations | | | | |
| Cr/SiO$_2$ activation | | | | | | | |
| Oxidation temp. (° C.): | 680 | 680 | 600(1) | 680 | 680 | 815 | 620 |
| Reduction temp. (° C.): | 380 | not red. | not red. | 380 | 380 | 380 | 380 |
| Polymerisation | | | | | | | |
| C6 in iC4 (wt %) | | | | | 0.16 | 2.92 | 2.92 |
| H2 in C2 (mol ppm) | | | | | | | 1270 |
| Reactor temp. (° C.) | 80 | 80 | 80 | 94 | 94 | 85 | 85 |
| Total pressure (baro) | 26.0 | 26.0 | 26.0 | 30.5 | 30.5 | 22.0 | 22.0 |
| Cat. weight (g): | 0.649 | 0.888 | 0.798 | 0.892 | 0.094 | 0.146 | 0.135 |
| Induction time (min): | 0 | 1 | 0 | 1.5 | | 0 | 0 |
| Run time (min): | 72 | 96 | 78 | 172 | | 60 | 60 |
| Polymer yield (g): | 1820 | 980 | 1630 | 1010 | | 178 | 224 |
| Productivity (g/g): | 2810 | 1000 | 2040 | 1130 | 1800 | 1220 | 1620 |
| Activity (g/g · hr): | 2370 | 680 | 1540 | 400 | 2000 | 1300 | 1800 |
| | | | Characterisation of polyethylenes | | | | |
| MFR2 | 0.43 | 0.12 | 0.96 | <0.01 | 1.3 | 1.3 | 21.4 |
| MFR21 | 10.2 | 5.5 | 16.5 | 1.4 | 24 | 30 | — |
| FRR | 17.2 | 46 | 17.2 | >140 | 18.5 | 23 | — |
| Density | 947 | 947 | 946 | 947 | 946 | 926 | 934 |
| G'(0,05) | 404 | 2140 | 11 | 11320 | 30 | 31 | 5.5 |
| η(0,05) | 17563 | 66701 | 7696 | 323524 | 8020 | 5580 | 530 |
| η(300) | 1353 | 1431 | 1412 | 1533 | 1250 | 1150 | 200 |
| PI | 0.5 | 0.8 | 0.4 | 7.7 | 0.41 | 0.44 | — |
| Mw | 160000 | 200000 | 130000 | 560000 | 69000 | 135000 | 78000 |
| Mn | 45000 | 41000 | 48000 | 12500 | 20500 | 26000 | 16000 |
| MWD | 3.6 | 4.9 | 2.5 | 42 | 3.1 | 5.1 | 4.9 |
| % SSC polymer | 82 | 70 | 100 | nd | 95 | 90 | 90 |

[1)] = Chromium oxide not reduced
[2)] = No impregnation with metallocene
nd = not determined

Example 8 (Comparative)

A polymerisation was performed analogously to the polymerisation procedure of EP 339,571 (Showa Denko). Two separate catalysts were used: (a) 0.302 g of the particulate Cr/SiO$_2$ catalyst used in example 2 (without any treatment with metallocene and MAO), and (b) a catalytic solution prepared according to steps (1) through (3) of the procedure for "Impregnation with a metallocene compound and MAO" disclosed above. The ratio between catalysts (a) and (b) were such that the ratios metallocene/silica and MAO/silica were equal to these ratios in the catalyst used in example 2. The general polymerisation procedure described above was followed, except that 1.5 bar of H$_2$ was fed to the reactor at 30° C., together with the Cr/SiO$_2$ catalyst, the catalytic solution and isobutane. The temperature inside the reactor was then increased to 80° C. before the ethylene feed was started. The polymerisation was continued for 44 minutes. A layer of polymers formed on the walls of the reactor and the stirrer. The produced polymer had a density of 956 g/dm$^3$, MFR2 of 1.5 and MFR21 of 38 g/10 min. The polyethylene had molecular weights Mw of 130,000, Mn of 1,900 and Mw/Mn of 70. The produced polyethylene had a GPC curve revealing two components each having narrow molecular weight distributions. None of these two components had the broadness of a chromium catalyst polymer.

Polyethylenes of the Present Invention Compared with Prior Art and Commercially Available Polyethylenes In table 4 below polyethylenes of the present invention (examples 2, 5, 6) are compared with a metallocene-based polyethylene (comparative example 3) and a polyethylene produced according to comparative example 8, and polyethylenes commercially available from applicant (Borealis) and other producers (named P1, P2, P3). The commercially available polyethylenes are intended for the same field of use as the polyethylenes of the present invention. Table 4, and also table 3, shows that all the polyethylenes of the present invention have a density lower than 950 g/dm$^3$ and a relatively narrow MWD expressed by Mw/Mn. The melt viscosity is favourably low compared with the commercially available grades, while the melt strength is of the same magnitude. This combination of low melt viscosity and good melt strength is very favourable in plastic processing, especially by extrusion processes. As can be seen from table 4, the present polyethylenes have a measured haul-off melt strength that is greater than the haul-off strength calculated by the equation $$HO = 9 \cdot 10^{-5} \eta_{0.05} + 0.4. \tag{2}$$

In contrast, the commercially available polyethylenes have all a lower measured haul-off melt strength than calculated.

The polyethylenes of the present invention also have a low content of very low molecular weight fraction. Table 4 indicates a VLMWF content of less than about 5% by weight.

TABLE 4

| | \multicolumn{10}{c}{Example} | | | | | | | | | |
|---|---|---|---|---|---|---|---|---|---|---|
| | 2 | 3 Comp. | 5 | 6 | 8 Comp. | Borealis HE 8214 | Borealis HE 8253 | P1 | P2 | P3 |
| Catalyst | A | SSC | A | B | | | | | | |
| MFR21 g/10 min | 5.5 | 16.5 | 24 | 30 | 38 | 2.9 | 10 | 2.5 | — | 9.5 |
| Density g/dm³ | 947 | 946 | 946 | 926 | 956 | 952 | 952 | 955 | 956 | 955 |
| Mw g/mol | 390000 | 130000 | 69000 | 135000 | 130000 | 350000 | 220000 | 475000 | 360000 | 370000 |
| Mn g/mol | 30000 | 48000 | 20500 | 26000 | 1900 | 17000 | 15000 | 9000 | 15000 | 40000 |
| Mw/Mn | 13 | 2.7 | 3.1 | 5.1 | 70 | 21 | 15 | 53 | 24 | 9.3 |
| VLMWF wt % | 4.7 | — | 4.6 | 4.2 | 37 | — | — | — | — | — |
| Viscosity $\eta_{0.05}$ Ns/m² | 62580 | 7380 | 6080 | 9460 | 5920 | 210000 | 72500 | 261150 | 146640 | 140575 |
| Haul-off melt strength (HO) g | 9.6 | 0.6 | 2.6 | 2.7 | 1.9 | 8.9 | 4.3 | 15 | 6.0 | 3.4 |
| Calculated HO (Eq. 2) | 6.0 | 1.1 | 1.1 | 1.3 | 0.9 | 19.3 | 6.88 | 23.9 | 13.6 | 13.1 |

What is claimed is:

1. A polyethylene produced by the homopolymerisation of ethylene or copolymerisation of ethylene with α-olefins in the presence of a catalyst, characterized in that the fraction of low molecular weight polymers having MW<5000 g/mole is lower than 12% by weight of the produced polymer, and that the produced polyethylene has a measured melt strength expressed by a haul-off (HO) value satisfying the expression:

$$HO > K_1 \cdot \eta_{0.05} + K_2,$$

wherein $K_1$ is $9 \cdot 10^{-5}$ and $K_2$ is 0.4.

2. A polyethylene produced by the homopolymerisation of ethylene or copolymerisation of ethylene with α-olefins in the presence of a catalyst, characterized in that the fraction of low molecular weight polymers having MW<5000 g/mole is lower than 12% by weight of the produced polymer, and that the produced polyethylene has a measured melt strength expressed by a haul-off (HO) value satisfying the expression:

$$HO > K_1 \cdot \eta_{0.05} + K_2$$

wherein $K_1 = 11 \cdot 10^{-5}$ and $K_2 = 0.7$.

3. The polyethylene of claim 1, characterized in that the content of very low molecular weight fraction is less than 7% by weight.

4. The polyethylene of claim 1, characterized in that the polyethylene has a density of less than 950 g/dm³.

5. The polyethylene of claim 1, characterized in that the melt index $MFR_{21}$ (determined according to ASTM D 1238) is in the range of from 1 to 10 g/10 min.

6. The polyethylene of claim 5, characterized in that the $MFR_{21}$ is in the range of from 1 to 30.

7. The polyethylene of claim 1, characterized by being produced under conditions of continuous feeding of monomers and catalyst.

8. The polyethylene of claim 1, characterized in that molecular hydrogen is present during polymerisation.

9. The polyethylene of claim 1, characterized by having been polymerised in the presence of a multisite particulate catalyst.

10. The polyethylene of claim 1, characterized by having been polymerised in the presence of a particulate modified catalyst comprising:

a) a chromium-oxide catalyst comprising a chromium oxide mainly in a bivalent oxidization state combined with an inorganic support containing about 85% by weight of silica, b) a transition metal compound comprising at least one cyclopentadienylic ring bonded to said transition metal, which cyclopentadienylic ring may contain hetero atoms, be unsubstituted or substituted, bonded to the transition metal through a bridge, optionally annealed to other substituted or unsubstituted ring structures, and if two cyclopentadienyl rings are present they may be bonded to each other through a bridge, and c) a catalyst activator being an aluminoxane.

11. The polyethylene of claim 10, characterized by comprising a single site polymer and a chromium oxide site polymer.

12. The polyethylene of claim 11, characterized by comprising not less than 40 wt % of single site polymer.

13. The polyethylene of claim 12, characterized by comprising not less than 60 wt % of single site polymer.

14. The polyethylene of claim 1, characterized by being produced in a single polymerisation process.

15. The polyethylene of claim 1, characterized by being produced in a one polymerisation stage.

16. The polyethylene of claim 14, characterized by being produced in a one polymerisation stage.

17. The polyethylene of claim 2, characterized in that the content of very low molecular weight fraction is less than 7% by weight.

18. The polyethylene of claim 2, characterized in that the polyethylene has a density of less than 950 g/dm³.

19. The polyethylene of claim 2, characterized by being produced under conditions of continuous feeding of monomers and catalyst.

20. The polyethylene of claim 2, characterized in that molecular hydrogen is present during polymerisation.

21. The polyethylene of claim 2, characterized by having been polymerised in the presence of a multisite particulate catalyst.

* * * * *

UNITED STATES PATENT AND TRADEMARK OFFICE
CERTIFICATE OF CORRECTION

PATENT NO.    : 6,541,581 B1
DATED         : April 1, 2003
INVENTOR(S)   : Arild Follestad et al.

It is certified that error appears in the above-identified patent and that said Letters Patent is hereby corrected as shown below:

Column 13,
Line 50, "1 to 10 g/10 min." should read -- 1 to 100 g/10 min --.

Signed and Sealed this

Second Day of September, 2003

JAMES E. ROGAN
*Director of the United States Patent and Trademark Office*